(12) United States Patent
Mitra et al.

(10) Patent No.: US 8,195,186 B2
(45) Date of Patent: *Jun. 5, 2012

(54) RESOURCE ALLOCATION

(75) Inventors: Diptendu Mitra, London (GB); Robert Arnott, London (GB)

(73) Assignee: NEC Corporation, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 12/312,222

(22) PCT Filed: Nov. 1, 2007

(86) PCT No.: PCT/JP2007/071673
§ 371 (c)(1),
(2), (4) Date: Apr. 30, 2009

(87) PCT Pub. No.: WO2008/054027
PCT Pub. Date: May 8, 2008

(65) Prior Publication Data
US 2010/0069081 A1    Mar. 18, 2010

(30) Foreign Application Priority Data

Nov. 1, 2006 (GB) .................................. 0621767.3
Jan. 9, 2007 (GB) .................................. 0700365.0

(51) Int. Cl.
*H04W 72/00* (2009.01)
(52) U.S. Cl. .................. 455/452.2; 455/452.1; 455/450; 370/329; 370/341
(58) Field of Classification Search ......................... None
See application file for complete search history.

(56) References Cited

U.S. PATENT DOCUMENTS

2001/0038614 A1 * 11/2001 Hautamaki et al. ........... 370/324
(Continued)

FOREIGN PATENT DOCUMENTS

EP    1 727 387 A2    11/2006
(Continued)

OTHER PUBLICATIONS

R1-062773—NEC Group, NTT DoCoMo—"Uplink Resource Allocation for EUTRA", Aug. 9-Oct. 13, 2006, Seoul, Korea.
(Continued)

*Primary Examiner* — Ajit Patel
(74) *Attorney, Agent, or Firm* — McGinn IP Law Group, PLLC

(57) ABSTRACT

Resource allocation information is signalled to user devices (UE1, UE2, UE3, UE4) in a mobile telecommunications communications system in which each user device is allocated plural resource allocations (RB) in a TTI (50) by, for each user device, providing information (I1) regarding a selected resource allocation allocated to that user device in a control channel (L1, L2, L3, L4) and providing information (I2, I3) regarding at least one other resource allocation allocated to that user device in a data channel (52) in the selected resource allocation. In one example, the selected resource allocation is the first resource allocation (RB1) allocated to that user device (UE1) and information regarding each successive further resource allocation is provided in a data channel in the resource allocation preceding that successive further resource allocation. In another example, the selected resource allocation is the first resource allocation allocated to that user device and information regarding each successive further resource allocation is provided in a data channel in the first resource allocation. In another example, the selected resource allocation is the resource allocation that is indicated to have the best channel quality. The resource allocation information may be provided in the data channel of the one resource allocation as a list of RFI fields or as a bit map.

25 Claims, 10 Drawing Sheets

U.S. PATENT DOCUMENTS

| | | |
|---|---|---|
| 2006/0146756 A1 | 7/2006 | Wang et al. |
| 2006/0240831 A1 | 10/2006 | Toskala et al. |
| 2008/0049697 A1 | 2/2008 | Breuer et al. |
| 2010/0027506 A1* | 2/2010 | Tanigawa et al. ............ 370/331 |
| 2010/0029245 A1* | 2/2010 | Wood et al. ................ 455/404.1 |
| 2010/0067477 A1* | 3/2010 | Chun et al. .................... 370/329 |
| 2010/0085881 A1* | 4/2010 | Tanigawa et al. ............ 370/252 |
| 2011/0090858 A1 | 4/2011 | Kwon et al. |

FOREIGN PATENT DOCUMENTS

| | | |
|---|---|---|
| EP | 1 819 107 A1 | 8/2007 |
| GB | 2 300 090 A | 10/1996 |
| GB | 2 377 585 A | 1/2003 |
| GB | 2 436 416 A | 9/2007 |
| KR | 10-2005-0084908 A | 8/2005 |
| WO | WO 00/14979 | 3/2000 |
| WO | WO 01/50782 A2 | 7/2001 |
| WO | WO 03/094561 A1 | 11/2003 |
| WO | WO 2004/016031 A2 | 2/2004 |
| WO | WO 2004/042954 A1 | 5/2004 |

OTHER PUBLICATIONS

Qualcomm Europe: "Design of L1/L2 Control in E-UTRA DL; 3GPP TSG-RAN WG1 LTE Ad Hoc R1-061799"Jun. 27, 2006, pp. 1-5, Cannes, France.
United Kindom Search Report dated Jan. 30, 2007.
United Kingdom Search Report dated Apr. 27, 2007.
Office Action dated Sep. 1, 2011 (U.S. Appl. No. 13/067,643).
Korean Office Action dated Aug. 19, 2011 (with an English translation).
Qualcomm Europe, Design of L1/L2 Control in E-EUTRA DL (3GPP TSG-RAN WG1 LTE Ad Hoc, R1-061799, Cannes, France, Jun. 27-30, 2006. (previously submitted).
European Search Report dated Oct. 13, 2009.

* cited by examiner

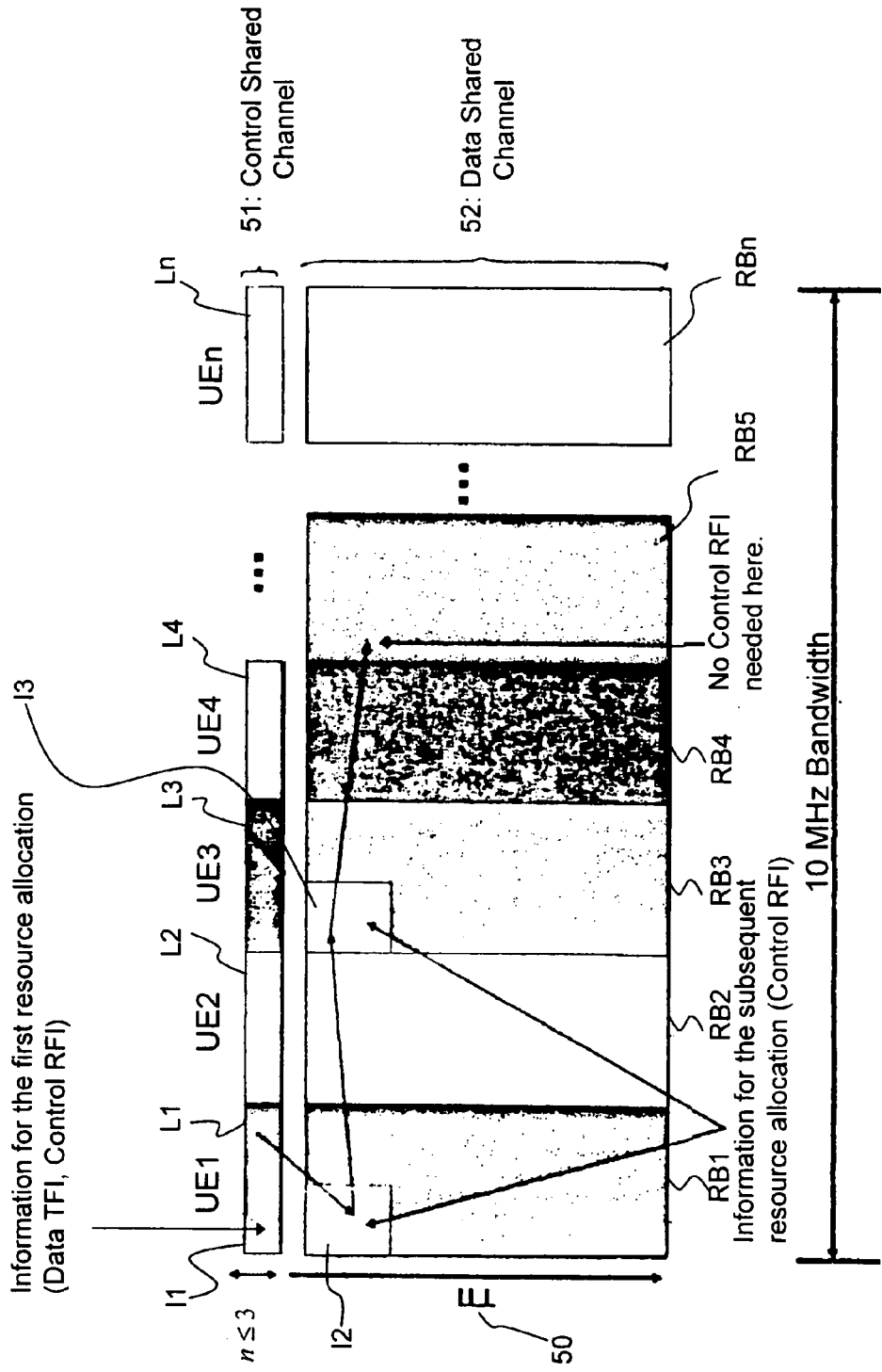

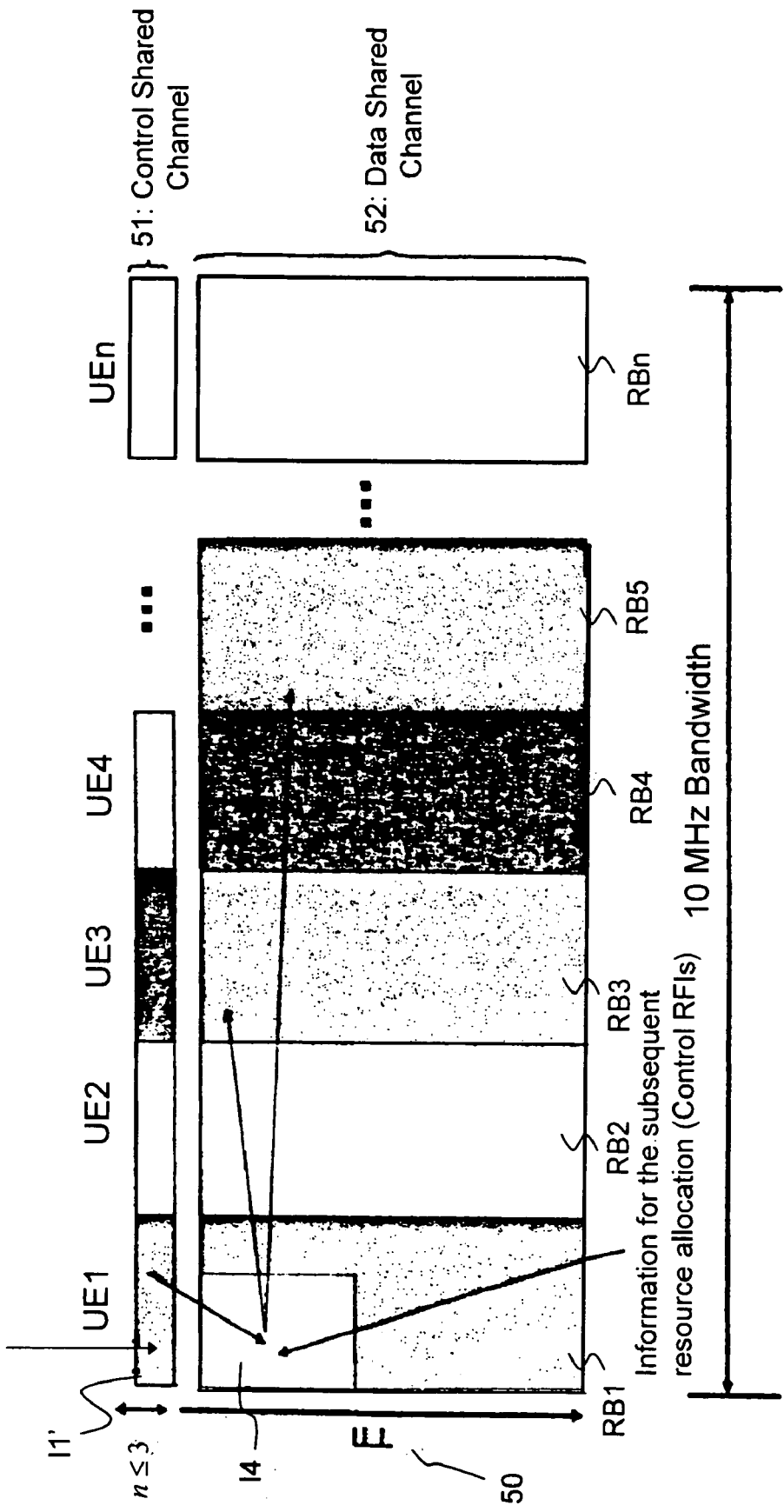

RESOURCE ALLOCATION

RELATED APPLICATIONS

The present application is claiming the benefit of priorities of the United Kingdom Patent Applications No. 06217673.3 of 1 Nov. 2006 and No. 0700365.0 of 9 Jan. 2007, which claims the internal priority of No. 06217673.3 of 1 Nov. 2006, the entire disclosures thereof being incorporated herein by reference thereto.

FIELD OF THE INVENTION

The present invention relates to mobile telecommunications networks, particularly but not exclusively to mobile telecommunications networks using the 3GPP standards and equivalents thereof.

BACKGROUND

Downlink and uplink multiple access schemes for the E-UTRA (Evolved Universal Terrestrial Radio Access) air interface are currently being studied in 3GPP (which is a standard based collaboration looking at the future evolution of third generation mobile telecommunication systems). Under the E-UTRA system, a base station which communicates with a number of user devices allocates the total amount of time/frequency resource (depending on bandwidth) among as many simultaneous users as possible, in order to enable efficient and fast link adaptation and to attain maximum multi-user diversity gain. The resource allocated to each user device is based on the instantaneous channel conditions between the user device and the base station and is informed through a control channel monitored by the user device. Details of E-UTRA are well-known to those skilled in the art and can be found in many publications.

DISCLOSURE OF THE INVENTION

The following analysis is given by the present invention.

Resource allocation information for both uplink from and downlink to scheduled E-UTRA User Equipment (UE) is carried by a shared common control channel. Since the number of bits available in the control channel is limited, efficient methods are needed to transmit the required information with the lowest number of bits. The Radio Access Network working group RAN1 is proposing the use of a bit map method to signal the resource allocation to each UE in the E-UTRA downlink. However, the bitmap based approach has a high overhead requiring one bit per physical resource block, that is 50 bits for a 10 MHz bandwidth. Accordingly, a way of signaling the resource allocation that reduces the signaling load would be desirable.

It is an object of the present invention to provide a method, system, or components thereof, or program therefor to reduce signalling load, such as high overhead in signalling resource allocation, in a mobile telecommunication system.

Other objects will become apparent in the entire disclosure including the claims and drawings.

MEANS TO SOLVE THE PROBLEMS

In one aspect, the present invention provides a method of signalling downlink resource allocation information in a communication system that is guaranteed to require a bit overhead less than that of a bitmap method. The proposed method can handle the following resource allocation:

Discontinuous units of localized allocation: A UE is allocated multiple discontinuous localized allocations where each localized allocation is a certain number of contiguous resource blocks.

In one aspect, the present invention provides a method of signalling resource allocation information in a communication system in which users are allocated plural resource allocations, wherein at least some resource allocation information is signalled in the data channel rather than in the control channel.

In another aspect, the present invention provides a method of signalling communications resource allocation information to user devices in a communications system in which each user device is allocated plural resource allocations, the method comprising, for each user device, providing resource allocation information regarding one of the resource allocations allocated to that user device in a control channel and providing resource allocation information regarding at least one other resource allocation allocated to that user device in a data channel in the one resource allocation. This reduces the amount of data that has to be transmitted in the control channel.

In an exemplary embodiment, the first resource allocation allocated to a user device is selected as the one resource allocation. Resource allocation information regarding a successive resource allocation is provided in a data channel in the preceding resource allocation. As another possibility, resource allocation information regarding all succeeding resource allocations is provided in the data channel in the one resource allocation.

The resource allocation information may be provided in the data channel of the one resource allocation as a list of RFI fields or as a bit map.

The resource allocation information may be provided in the data channel of the one resource allocation as a list of RFI fields or as a bit map, dependent upon the number of other resource allocations for which resource allocation information is provided. The control channel may have an indicator that identifies the number of other resource allocations for which resource allocation information is provided and whether the resource allocation information is provided as a list of RFI fields or as a bit map.

In an exemplary embodiment, the resource allocation that has the best channel quality indicator is selected as the one resource allocation. The resource allocation information regarding each successive further resource allocation may be provided in the data channel in the selected resource allocation.

In an exemplary embodiment, each user device has a dedicated control channel. In an exemplary embodiment, each control channel is provided in the first resource allocation allocated to the corresponding user device. This should increase the possibility of correct demodulation of the control channel.

In an exemplary embodiment, each control channel is provided in the resource allocation allocated to the corresponding user device that has the best channel quality indicator. This should increase the possibility of correct decoding by a user device. In an exemplary embodiment, each control channel is provided in the one resource allocation of the corresponding user device.

In an exemplary embodiment, the control channels are provided in a consecutive series of resource allocations which may be at the start of a Transmission Time Interval (TTI). This should reduce control channel decoding delay. The user devices may be caused to try to have their control channels provided in the resource allocation indicated to have the best channel quality for that user device. This should reduce control channel decoding delay while increasing the possibility of correct decoding by a user device.

In an exemplary embodiment, each discontinuous localized resource allocation comprises a certain number of contiguous resource blocks.

In an exemplary embodiment, the communications system comprises a telecommunications system such as a cellular telecommunications system and the user devices may be or comprise cellular telephones.

The present invention also provides a base station configured to carry out a method in accordance with any of the above aspects.

The present invention also provides a method of obtaining resource allocation information in a mobile telecommunications system in which each user device is allocated plural resource allocations, the method comprising a user device:

determining from a control channel transmitted by a base station resource allocation information regarding one of the resource allocations allocated to that user device; and determining from a data channel in the one resource allocation resource allocation information regarding at least one other resource allocation allocated to that user device. The present invention also provides a user device configured to carry out such a method.

These and various other aspects of the invention will become apparent, from the following detailed description of exemplary embodiments which are given by way of example only and which are described with reference to the accompanying Drawings.

BRIEF DESCRIPTION OF THE DRAWINGS

FIG. 4 shows a diagram for explaining a first method in accordance with the invention for signalling downlink resource allocation, which represents linked discontinuous allocation signalling included in the scheduled resource blocks.

FIG. 5 shows a diagram for explaining a second method in accordance with the invention for signalling downlink resource allocation, which represents concatenated discontinuous resource allocation signalling included in the scheduled resource blocks.

FIGS. 7 to 10 show diagrams for explaining other methods in accordance with the invention for signalling downlink resource allocation, among which:

FIG. 7 shows that shared control channel is transmitted in the RB with the best CQI allocation information is located in shared data channel RB with the best CQI maximises probability of successful decoding at UE, FIG. 8 shows that shared control channel is filled from the left allocation information is located in shared data channel RB with the best CQI minimizes decoding delay of shared control channel since UE will decode from the left, FIG. 9 shows that shared control channel is filled from the left, but UEs are ordered to try to transmit each UE's shared control channel in the RB with the best possible CQI for that user, allocation information is located in shared data channel RB with the best CQI minimises decoding delay of shared control channel whilst trying to maximise probability of correct decoding, FIG. 10 shows that it is possible that the shared control channel and shared data channel will be multiplexed in frequency instead of in time.

DESCRIPTION OF PREFERRED MODES

Figure 1:
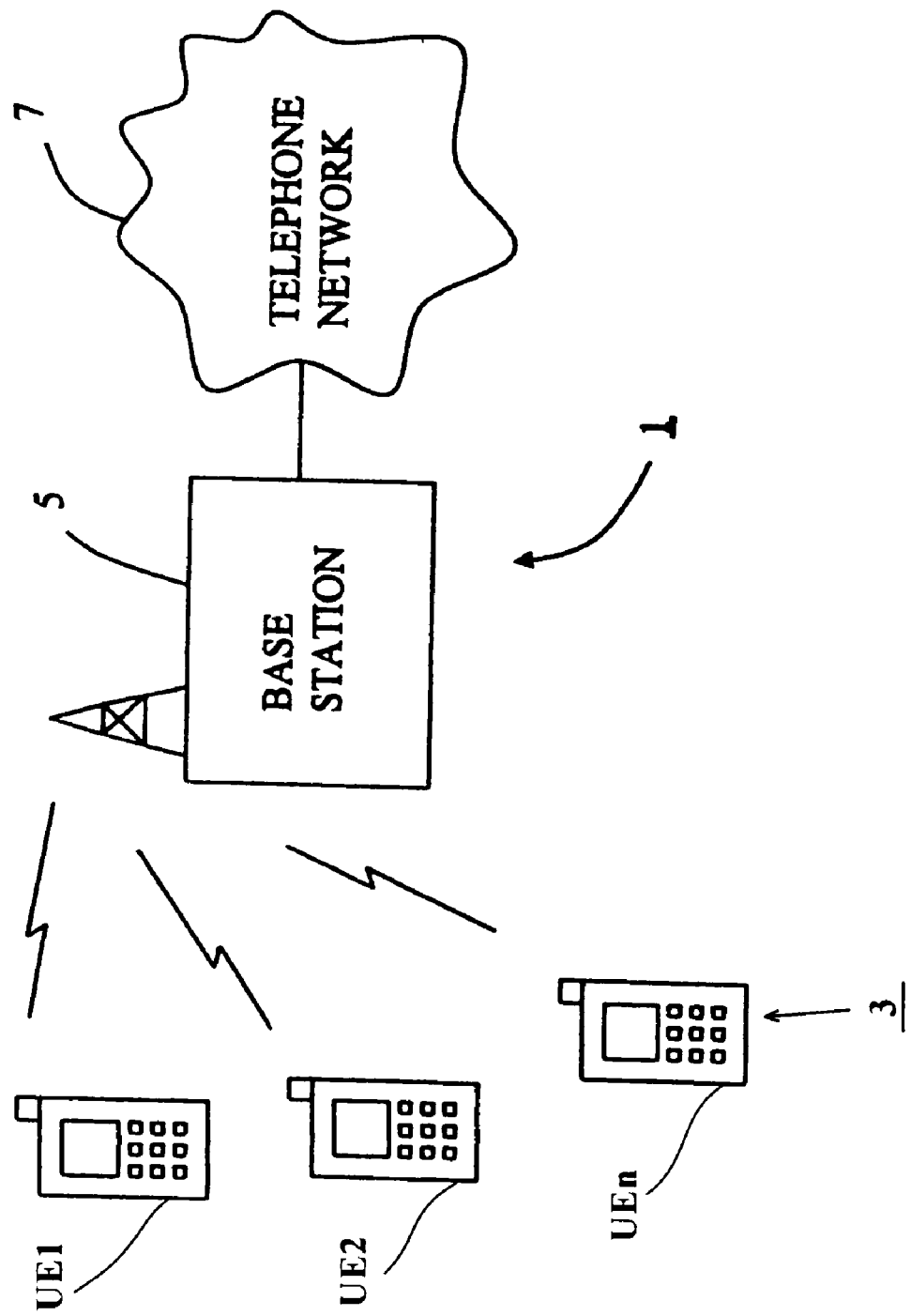
FIG. 1 schematically illustrates a communication system comprising a number of user mobile (cellular) telephones which communicate with a base station connected to the telephone network.

In the following, proffered aspects and modes for carrying out the present invention are disclosed.
(Aspect 1.)

There is provided a method of signalling communications resource allocation information to user devices in a mobile telecommunications system in which each user device is allocated plural resource allocations, the method comprising, for each user device, providing resource allocation information regarding one of the resource allocations allocated to that user device in a control channel and providing resource allocation information regarding at least one other resource allocation allocated to that user device in a data channel in the one resource allocation. (Mode 1)

The method may comprise, for each user device, selecting the first resource allocation allocated to that user device as the one resource allocation. (Mode 1-1)

The method may comprise for each user device, selecting the resource allocation allocated to that user device that has the best channel quality indicator as the one resource allocation. (Mode 1-2)

The method may comprise, for each user device, providing in the data channel in the one resource allocation resource allocation information regarding the other resource allocations allocated to the user device. (Mode 1-3)

The method may comprise, for each user device, providing resource allocation information regarding a successive resource allocation in a data channel in the preceding resource allocation. (Mode 1-4)

The method may comprise, for each user device, selecting the first resource allocation allocated to that user device as the one resource allocation, and providing resource allocation information regarding the next resource allocation in the data channel in the first resource allocation. (Mode 1-5)

The method may comprise, for each user device, selecting the first resource allocation allocated to that user device as the one resource allocation, and providing resource allocation information regarding each successive further resource allocation in a data channel in the resource allocation preceding that successive further resource allocation. (Mode 1-6)

The method may comprise, for each user device, selecting the first resource allocation allocated to that user device as the one resource allocation, and providing resource allocation information regarding each successive further resource allocation in the data channel in the one resource allocation. (Mode 1-7)

The method may comprise providing with the resource allocation information in the control channel data indicating at least one of the size of the resource allocation information regarding each successive further resource allocation, and the number of resource allocations allocated to that user device. (Mode 1-8)

The method comprise providing with the resource allocation information data indicating whether or not there are additional resource allocations. (Mode 1-9)

The method may comprise, for each user device, selecting the resource allocation allocated to that user device that is indicated to have the best channel quality as the one resource allocation, and providing resource allocation information regarding the other resource allocations allocated to the user device in the data channel of the one resource allocation. (Mode 1-10)

In the method according to Mode 1-3, 1-6, 1-7 or 1-10, the resource allocation information is provided in the data channel of the one resource allocation as a list of RFI fields or as a bit map, dependent upon the number of other resource allocations for which resource allocation information is provided. (Mode 1-11)

In the method according to Mode 1-11, the control channel has an indicator that identifies the number of other resource allocations for which resource allocation information is provided and whether the resource allocation information is provided as a list of RFI fields or as a bit map. (Mode 1-12)

In the method according to any of the preceding Modes, the method further comprise transmitting the control channel in a resource allocation having the best channel quality indicator. (Mode 1-13)

In the method according to any of Modes 1 to 1-12, there is a plurality of control channels each containing scheduling information for a corresponding user device, or there is a single joint coded control channel or a plurality of joint coded control channels. (Mode 1-14)

In the method according to any of Modes 1 to 1-12, there is a plurality of control channels each containing scheduling information for a corresponding user device and the method comprises transmitting each control channel in the first resource allocation allocated to the corresponding user device. (Mode 1-15)

In the method according to any of Modes 1 to 1-12, there is a plurality of control channels each containing scheduling information for a corresponding user device and the method comprises transmitting each control channel in the resource allocation allocated to the corresponding user device that has the best channel quality indicator. (Mode 1-16)

In the method according to any of Modes 1 to 1-12, there is a plurality of control channels each containing scheduling information for a corresponding user device and the method comprises transmitting each control channel in the one resource allocation of the corresponding user device. (Mode 1-17)

In the method according to any of Modes 1 to 1-12, there is a plurality of control channels each containing scheduling information for a corresponding user device and the method comprises transmitting the control channels in a consecutive series of resource allocations. (Mode 1-18)

In the method according to any of Modes 1 to 1-12, there is a plurality of control channels each containing scheduling information for a corresponding user device and the method comprises transmitting the control channels in a consecutive series of resource allocations. (Mode 1-19)

In the method according to Modes 1-16 to 1-18, the method further comprises transmitting the control channels in a consecutive series of resource allocations and causing each user device to try to have its control channel transmitted in the resource allocation indicated to have the best channel quality for that user device. (Mode 1-20)

In the method according to any of the preceding Modes, the method further comprises additionally providing with the resource allocation information in a control channel demodulation information to enable the user device to demodulate received data. (Mode 1-21)

In the method according to any of Modes 1 to 1-20, the method further comprises providing the resource allocation information in a control transport indication which also comprises data indicating whether or not there are additional resource allocations for that user device. (Mode 1-22)

(Aspect 2.)

There is provided a method of signalling communications resource allocation information to user devices in a mobile telecommunications communications system, in which each user device is allocated plural discontinuous localized resource allocations in which data and control information is communicated to that user device on data and control channels, the method comprising, for each user device, providing in a control channel resource allocation information regarding a first resource allocation allocated to that user device and providing resource allocation information regarding each subsequent resource allocation allocated to that user device in the data channel in the preceding resource allocation. (Mode 2)

The method according to Mode 2 may further comprise providing with the resource allocation information data indicating whether or not there are additional resource allocations for that user device. (Mode 2-1)

(Aspect 3.)

There is provided a method of signalling communications resource allocation information to user devices in a mobile telecommunications communications system, in which, in a given transmission time interval (TTI) each user device is allocated plural discontinuous localized resource allocations in which data and control information is communicated to that user device on data and control channels, the method comprising, for each user device, providing resource allocation information regarding a first resource allocation allocated to that user device in a control channel and providing resource allocation information regarding the or each further resource allocation allocated to that user device in the data channel in the first resource allocation. (Mode 3)

In the method according to Mode 3, wherein the resource allocation information provided in the control channel includes resource allocation information regarding at least one of the size and number of resource allocations allocated to that user device. (Mode 3-1)

(Aspect 4.)

There is provided a method of signalling communications resource allocation information to user devices in a mobile telecommunications communications system, in which, in a given transmission time interval (TTI), each user device is allocated plural discontinuous localized resource allocations in which data and control information is communicated to that user device on data and control channels, the method comprising, for each user device, providing in a control channel resource allocation information regarding the resource allocation allocated to that user device that has the best channel quality indicator and providing resource allocation information regarding the or each further resource allocation allocated to that user device in the data channel in the resource allocation having the best channel quality indicator. (Mode 4)

In the method according to Mode 4, for each user device, the control channel is provided in the resource allocation having the best channel quality indicator. (Mode 4-1)

In the method according to Mode 4, the respective control channels are provided in successive resource allocations. (Mode 4-2)

In the method according to Mode 4, the respective control channels are provided in successive resource allocations and each user device is caused to try to have its control channel transmitted in the resource allocation indicated to have the best channel quality for that user device. (Mode 4-3)

In the method according to any of Mode 3 to Mode 4, the resource allocation information is provided in the data channel of the one resource allocation as a list of RFI fields or as a bit map, dependent upon the number of other resource allocations for which resource allocation information is provided. (Mode 4-4)

In the method according to Mode 4-4, wherein the control channel has an indicator that identifies the number of other resource allocations for which resource allocation information is provided and whether the resource allocation information is provided as a list of RFI fields or as a bit map. (Mode 4-5)

In any of the preceding Modes, each discontinuous localized resource allocation comprises a certain number of contiguous resource blocks. (Mode 4-6)

In any of the preceding Modes, said communication system uses a plurality of sub-bands, each of which comprises sub-carriers, and wherein the method generates respective resource allocation information for sub-carrier allocation in each sub-band. (Mode 4-7)

In any of the preceding Modes, the control and data channels are separated by time-division multiplexing. (Mode 4-8)

In the method according to any of Mode 1 to Mode 4-7, the control and data channels are separated by frequency-division multiplexing. (Mode 4-9)

In the method according to any of the preceding Modes, the user devices are cellular telephones. (Mode 4-10)

(Aspect 5.)

There is provided a base station configured to carry out a method in accordance with any of preceding Modes. (Mode 5)

(Aspect 6.)

There is provided a base station for signalling communications resource allocation information to user devices in a mobile telecommunications communications system in which each user device is allocated plural resource allocations, the base station having a resource allocation module operable, for each user device: to provide resource allocation information regarding one of the resource allocations allocated to that user device in a control channel; and to provide resource allocation information regarding at least one other resource allocation allocated to that user device in a data channel in the one resource allocation. (Mode 6)

(Aspect 7.)

There is provided a base station for signalling communications resource allocation information to user devices in a mobile telecommunications communications system in which each user device is allocated plural resource allocations, the base station comprising: means for providing resource allocation information regarding one of the resource allocations allocated to a user device in a control channel; and means for providing resource allocation information regarding at least one other resource allocation allocated to that user device in a data channel in the one resource allocation. (Mode 7)

(Aspect 8.)

There is provided a base station for signalling communications resource allocation information to user devices in a mobile telecommunications communications system in which each user device is allocated plural resource allocations, the base station having a resource allocation module operable, for each user device: to provide resource allocation information regarding one of the resource allocations allocated to that user device in a control channel; and to provide resource allocation information regarding each other resource allocation allocated to that user device as a bit map in a data channel in the one resource allocation. (Mode 8)

(Aspect 9.)

There is provided a method of obtaining resource allocation information in a mobile telecommunications system in which each user device is allocated plural resource allocations, the method comprising a user device: determining from a control channel transmitted by a base station resource allocation information regarding one of the resource allocations allocated to that user device; and determining from a data channel in the one resource allocation resource allocation information regarding at least one other resource allocation allocated to that user device. (Mode 9)

In the method according to Mode 9, the user device determines the resource allocation information regarding at least one other resource allocation from the data channel of the first resource allocation allocated to that user device. (Mode 9-1)

In the method according to Mode 9, wherein the user device determines the resource allocation information regarding at least one other resource allocation from the data channel of the resource allocation allocated to that user device that has the best channel quality indicator. (Mode 9-2)

In the method according to Mode 9, 9-1 or 9-2, the user device determines the resource allocation information regarding the other resource allocations allocated to the user device from the data channel of the one resource allocation. (Mode 9-3)

In the method according to any of Mode 9 to Mode 9-2, the resource allocation information is provided in the data channel of the one resource allocation as a list of RFI fields or as a bit map. (Mode 9-4)

In the method according to Mode 9-4, wherein the control channel has an indicator that identifies the number of other resource allocations for which resource allocation information is provided and whether the resource allocation information is provided as a list of RFI fields or as a bit map. (Mode 9-5)

In the method according to any of Mode 1 to Mode 9-3, the user device determines the resource allocation information regarding a successive resource allocation from information in a data channel in the preceding resource allocation. (Mode 9-6)

(Aspect 10.)

There is provided a user device which is operable to communicate with the base station of Mode 5, 6, 7 or 8 and which is operable to carry out a method in accordance with any of Mode 9 to Mode 9-6. (Mode 10)

(Aspect 11.)

There is provided a user device for use in a mobile telecommunications system in which each user device is allocated plural resource allocations, the user device comprising a resource allocation module operable:

to determine from a control channel transmitted by a base station resource allocation information regarding one of the resource allocations allocated to that user device; and to determine from a data channel in the one resource allocation resource allocation information regarding at least one other resource allocation allocated to that user device. (Mode 11)

(Aspect 12.)

There is provided a user device for use in a mobile telecommunications system in which each user device is allocated plural resource allocations, the user device comprising:

means for determining from a control channel transmitted by a base station resource allocation information regarding one of the resource allocations allocated to that user device; and means for determining from a data channel in the one resource allocation resource allocation information regarding at least one other resource allocation allocated to that user device. (Mode 12)

(Aspect 13.)

There is provided a user device for use in a mobile telecommunications system in which each user device is allocated plural resource allocations, the user device comprising a resource allocation module operable:

to determine from a control channel transmitted by a base station resource allocation information regarding one of the resource allocations allocated to that user device; and to determine from a list of RFI fields or bit map in a data channel in the one resource allocation resource allocation information regarding at least one other resource allocation allocated to that user device. (Mode 13)

The user device according to any of Modes 10 to 13 in the form of a mobile telephone. (Mode 10-1)

(Aspect 14.)

There is provided computer implementable instructions to program a programmable device to perform the method of any of preceding modes. (Mode 14)

(Aspect 15.)

There is provided a signal comprising computer implementable instructions to program a programmable device to perform the method of any of preceding modes. (Mode 15)

(Aspect 16.)

There is provided a computer-readable medium storing computer implementable instructions in accordance with Mode 14. (Mode 16)

OVERVIEW

FIG. 1 schematically illustrates a mobile (cellular) telecommunication system 1 in which users of user equipments in the form of mobile telephones (cellphones) UE1, UE2, and UEn can communicate with other users (not shown) via a base station 5 and a telephone network 7. In this exemplary embodiment, the base station 5 uses an orthogonal frequency division multiple access (OFDMA) technique in which the data to be transmitted to the mobile telephones UE is modulated onto a plurality of sub-carriers. Different sub-carriers are allocated to each mobile telephone UE depending on the supported bandwidth of the mobile telephone UE and the amount of data to be sent to the mobile telephone UE. In this exemplary embodiment the base station 5 also allocates the sub-carriers used to carry the data to the respective mobile telephones UE in order to try to maintain a uniform distribution of the mobile telephones UE operating across the base station's bandwidth. To achieve these goals, the base station 5 dynamically allocates subcarriers for each mobile telephone UE and signals the resource allocations for each time point (TTI) to each of the scheduled mobile telephones UE.

Information has to be signalled to each of the mobile telephones UE to advise them of the scheduling decision within each sub-band. The information to be signalled includes:
i) resource block allocation information (for both downlink communications and uplink communications);
ii) resource block demodulation information for the downlink;
iii) resource block demodulation information for the uplink;
iv) ACK/NACK for uplink transmissions; and
v) timing control bits.

The present invention provides a method for signalling downlink resource allocation which should, in most situations, require fewer bits (a lower bit overhead) than the use of the above-mentioned bit map method.

Base Station

Figure 2:
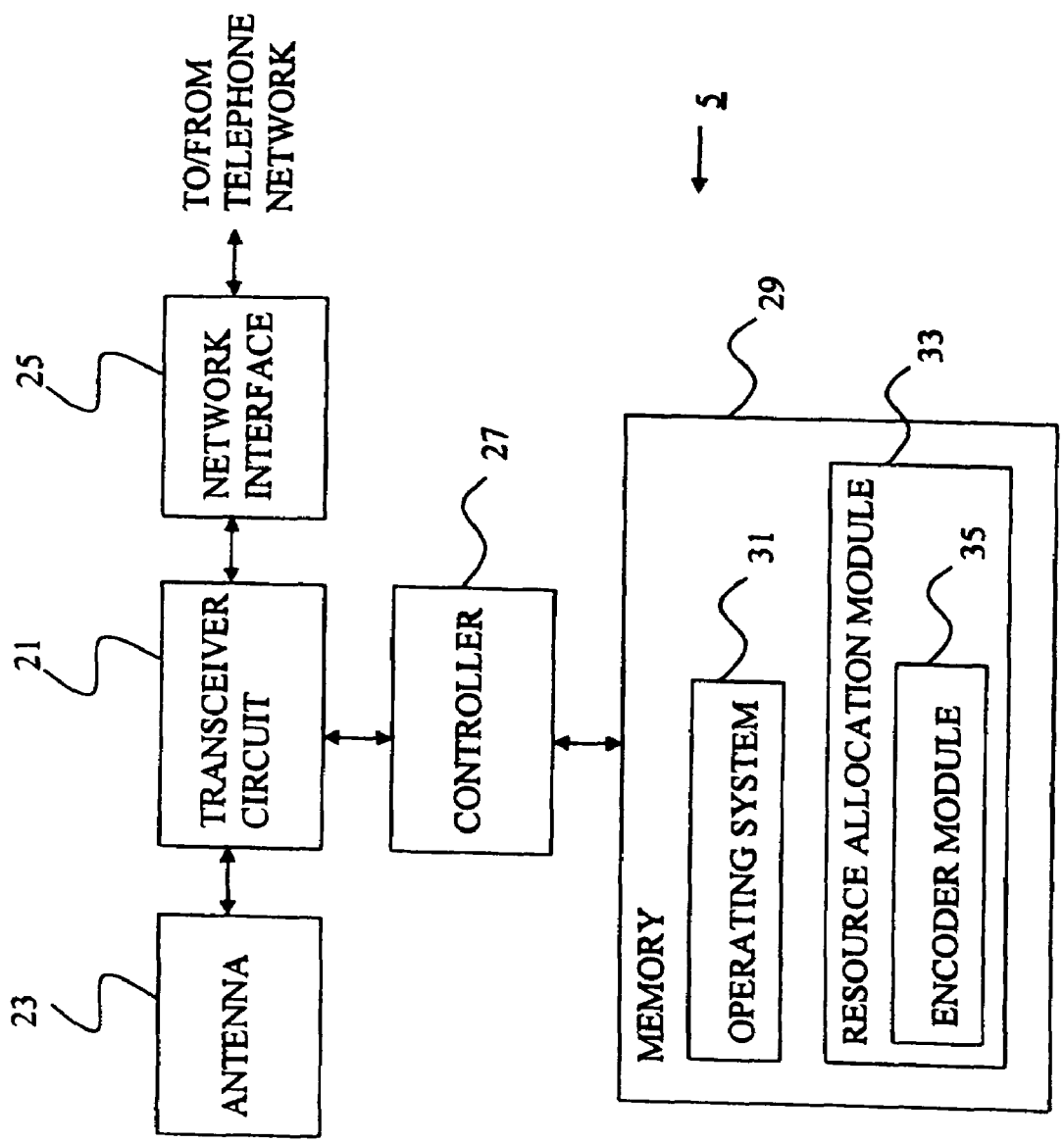
FIG. 2 is a block diagram illustrating the main components of the base station shown in FIG. 1.

FIG. 2 is a block diagram illustrating the main components of the base station 5 used in this embodiment. As shown, the base station 5 includes a transceiver circuit 21 which is operable to transmit signals to and to receive signals from the mobile telephones UE via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 and a resource allocation module 33. The resource allocation module 33 is operable to allocate the sub-carriers used by the transceiver circuit 21 in its communications with the mobile telephones UE. As shown in FIG. 2, the resource allocation module 33 also includes an encoder module 35 which encodes the allocation into an efficient representation which is then communicated to the respective mobile telephones UE. The method of resource allocation used may be a method of discontinuous units of localized allocation in which each mobile telephone UE is allocated multiple discontinuous localized allocations where each localized allocation is a certain number of contiguous resource blocks or a distributed chunk allocation method in which a mobile telephone UE is allocated multiple discontinuous physical resource blocks.

Mobile Telephone

Figure 3:
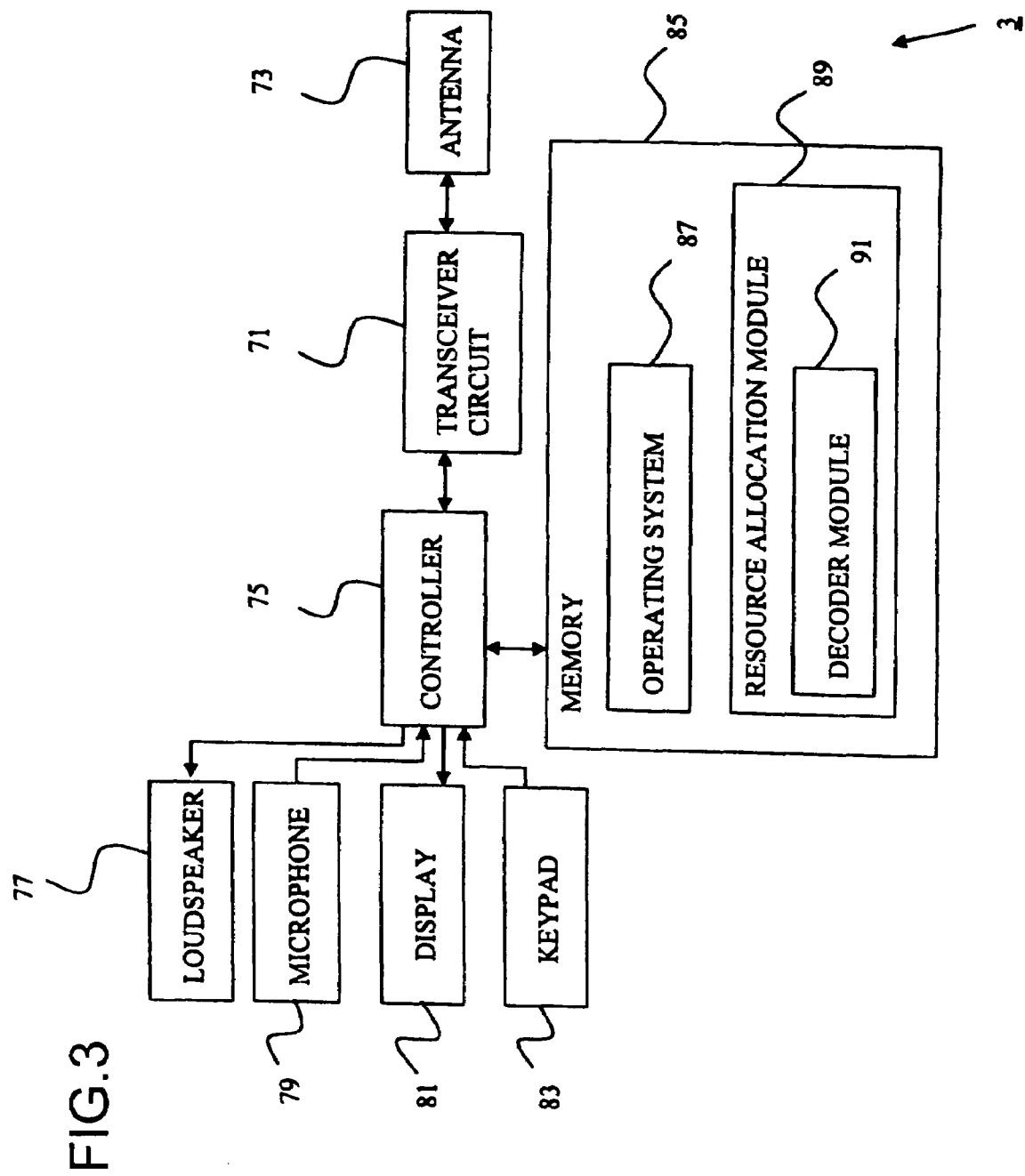
FIG. 3 is a block diagram illustrating the main components of one of the mobile telephones shown in FIG. 1.

FIG. 3 schematically illustrates the main components of each of the mobile telephones UE shown in FIG. 1. As shown, each mobile telephone UE includes a transceiver circuit 71 which is operable to transmit signals to and to receive signals from the base station 5 via one or more antennae 73. As shown, the mobile telephone UE also includes a controller 75 which controls the operation of the mobile telephone UE and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a communications module (resource allocation module) 89. In this embodiment, the communications module 89 includes a decoder module 91 which is operable to decode the resource allocation data signalled from the base station 5 to determine that mobile telephone's sub-carrier allocation for the current time point.

First Example

A first method in accordance with the invention for signalling downlink resource allocation will now be explained with the aid of FIG. 4 which shows a diagram representing part of a TTI 50 of frequency division multiplexed resource blocks RB and comprising a fixed size shared control channel set 51 monitored by the mobile telephones and a shared data channel 52.

FIG. 4 shows downlink resource allocation for mobile telephones UE1 to UEn. This figure shows the case for individually coded control channels and illustrates an example where a mobile telephone UE1 is scheduled to receive data on three discontinuous localised resource block allocations RB1, RB3 and RB5. We are not proposing here any multiplexing scheme for the downlink L1/L2 control channels.

As shown, the resource allocation module 33 has in this example allocated resource blocks RB1, RB3 and RB5 of the shared data channel to mobile telephone UE1, resource block RB2 to mobile telephone UE2, resource block RB4 to mobile telephone UE3 and resource block RBn to mobile telephone UEn. In this example, the resource allocation module 33 causes the control channels L1 to L4 and Ln for the mobile telephones UE1 to UE4 and UEn to be transmitted in the first resource blocks allocated to those mobile telephones (that is resource blocks RB1, RB2, RB3, RB4 and RBn in the example shown). It will of course be appreciated that this is merely an example and that other resource allocations are possible.

Each mobile telephone UE monitors the set of fixed size shared control channels 51 which indicate the resource allocation for the first localised set only. Information about subsequent localised allocations within the same TTI is provided within the resource blocks of the current allocation.

Thus, in this exemplary embodiment, the resource allocation module 33 of the base station 5 is configured to control the location of information indicating the downlink resource allocation for a TTI so that each control channel L1 to Ln contains resource allocation information only for the first resource block allocated to the corresponding mobile telephone and so that resource allocation information identifying the next (second) resource block allocated to that mobile telephone is provided within the first resource block of the current allocation and information for any third resource block is provided within the second resource block, and so on. This reduces the amount of data that has to be transmitted in the control channel.

Thus, in the example shown in FIG. 4, information I1 identifying the first resource block RB1 for the mobile telephone UE1 is provided in the shared control channel 51 but information I2 indicating the second downlink resource allocation or resource block for the mobile telephone UE1 is provided in the first resource block RB1 and information I3 indicating the third downlink resource allocation is provided in the resource block RB3. Although only three resource blocks RB1, RB3 and RB5 are shown for the mobile telephone UE1, it will be appreciated that the same procedure will be used for subsequent resource blocks so that, for a given TTI and mobile telephone, resource allocation information for the first resource block is provided in the shared control channel and resource allocation information for each succeeding resource block is provided in the immediately preceding resource block.

The downlink resource allocation information can be signalled by using an optimised tree-based method for signalling contiguous allocations described in R1-062773-NEC Group, NTT DoCoMo-"Uplink Resource Allocation for EUTRA" (which is available at http://www.3gpp.org/ftp/tsg_ran/WG1_RL1/TSGR1_46bis/Docs/) and in UK Patent Application No. 0605581.8 (Our ref P28952 GB), the whole contents of which are hereby incorporated by reference. As per the current working assumption in 3GPP, there are 50 resource blocks within a 10 MHz bandwidth leading to an 11 bit resource allocation within the shared control channel using the tree-based signalling method proposed in the above-mentioned paper and in UK Patent Application No. 0605581.8.

In addition to the resource allocation information, the shared control channel 51 also needs to contain an indicator or "Follow Up" bit indicating the presence or absence of subsequent additional discontinuous resources within the scheduled data block. Thus, a 12 bit length string (assuming 10 MHz UE capability) following the UE ID within the shared control channel L1, L2, L3 or L4 is sufficient to contain information about the first allocated resource block and an indication of the presence of additional resources within the same TTI.

The 11 bit resource allocation information together with the "Follow Up" bit (total of 12 bits) can be called a "Control RFI" within the shared control channel L1, L2, L3 or L4, where RFI is the Resource Format Indicator. The shared control channel L1, L2, L3 or L4 also carries a Transport Format Indicator TFI for data to enable the mobile telephone UE to demodulate its data accurately.

In this example, when there is additional or linked resource allocation, the resource allocation module 33 sets a "Follow Up" bit of 1 in the control RFI of the shared control channel to indicate to the mobile telephone UE that there is additional or linked resource allocation (it will be appreciated that the opposite convention could be used so that a zero indicates the presence of at least one additional resource block). Thus, in this example, if the "Follow Up" bit in the control RFI of the shared control channel is 1, it indicates linked resource allocation to the mobile telephone UE so that the mobile telephone is thus alerted to expect an additional control RFI in the first localised allocation block, 0 indicates otherwise.

In the same manner, the resource allocation module 33 will set the "Follow Up" bit in the control RFI in the first localised allocation resource block to 1, if there is a further linked resource allocation (data and control RFI (if present)). For example, in the case shown in FIG. 4, the resource allocation module 33 will set the "Follow Up" bit in the control RFI 12 in resource block RB1 to indicate to the mobile telephone UE1 that there is a linked resource allocation RB3 and will set the "Follow Up" bit in the control RFI 13 in resource block RB3 to indicate to the mobile telephone UE1 that there is a linked resource allocation in the form of resource block RB5, and so on. This method of indication proceeds, until the last localised allocation within the TTI is reached and that resource block will of course have a "Follow Up" bit of 0, indicating that there are no further localised allocations for that mobile telephone in the current TTI.

The proposed mechanism has a number of advantages over the bitmap method—

- Since the resource blocks allocated to the mobile telephone UE are based on CQI (Channel Quality Indicator) reports and are among the ones with the best reception quality at the mobile telephone UE, placing the control information within the same resource blocks will increase the possibility of correct demodulation of the control information
- Assuming individual coded control channels, a mobile telephone UE needs to read a single control channel to decipher its resource allocation across the whole bandwidth as opposed to multiple channels where each can provide resource allocation information across a particular part of the bandwidth. The individual control channels are all also of the same size since the size is determined by the number of bits in the resource allocation pattern within the control channel. This means that there is no need for the mobile telephone UE to detect the control channel boundaries using any bit pattern or blind detection methods. Buffering requirements for the mobile telephone UE is also reduced since the mobile telephone UE can stop reading additional control channels as soon as it detects its own ID in one as opposed to the case where multiple control channels provide resource allocation information to the mobile telephone UE.

Assuming 10 MHz UE capability and control signalling indicating resource allocation for the entire 10 MHz band, up to 4 discontinuous localised resource allocations can be supported with a total resource requirement less than a single 50 bit bitmap (assuming 12 bits in each control RFI). Alternatively, if each allocation is done in units of smaller bandwidths, the total bit overhead can be further reduced (e.g. resource allocation over 2.5 MHz requires 7 bits as discussed in the afore mentioned paper R1-062773-NEC Group, NTT DoCoMo-"Uplink Resource Allocation for EUTRA" and in UK Patent Application No. 0605581.8) implying that 28 bits can be used to indicate resource allocation across the entire 10 MHz bandwidth).

Since the OFDM (Orthogonal Frequency Division Multiplexing) symbols reserved for carrying the control channel (possibly first and second OFDM symbol) do not include all the resource allocation information, the overhead per mobile telephone UE within these resources is reduced leading to more mobile telephone UEs being multiplexed within the control resources.

The data and control RFI (if present) in the first localised allocation can be encoded together in order to achieve a larger coding gain. However, it is better to encode the control RFI separately for a reliable detection at the cell edge as there is no HARQ (Hybrid Automatic Repeat reQuest) retransmission for the control part.

Size Estimate of RFI

This section provides an estimate of the size of the individual RFIs in order to quantify their resource occupancy within each discontinuous localised resource blocks.

As set out above, the control RFI is 12 bits (11 bit resource allocation and 1 bit "Follow Up") which when protected with an 8 bit CRC and encoded using a 1/3 code occupies 30 subcarriers assuming QPSK modulation. Higher order modulations can be used to carry the control information since they are present on resource blocks on which the mobile telephone UE has good channel conditions. This will further reduce the subcarriers used to transmit the control information. The exact mapping of the subcarriers carrying the control information onto the time-frequency plane is not specified here and is for further discussion.

Other Variants

In other variants, all of the subsequent control RFIs are combined and included within the first discontinuous localised resource allocation or the one with best CQI, i.e. the best channel condition. The potential advantage of this method is the larger coding gain due to the concatenation of all the control RFIs of the discontinuous localised allocations. However, since the number of control RFIs in a TTI is dynamic and will depend on the number of discontinuous localised allocations assigned to the user by the scheduler, an additional field will be needed within the main shared control channel to indicate the size of the concatenated control RFIs. For example, 2-bit and 3-bit in the main shared control channel may be enough to indicate up to 3 and 7 discontinuous localised allocations for 5 MHz and 20 MHz bandwidths, respectively. In that case, "Follow Up" bit is not needed. This two bit field could alternatively be placed in the data channel along with the control RFIs.

Second Example

A second method in accordance with the invention for signalling downlink resource allocation will now be explained with the aid of FIG. 5 which like FIG. 4 shows a diagram representing part of a TTI 50 again comprising resource blocks RB providing a shared data channel 52 and a corresponding set 51 of fixed size shared control channels L1, L2, L3 and L4 monitored by the mobile telephones UE1 to UEn. In the method represented by FIG. 5, the resource allocation module 33 of the base station 5 is configured to cause (for each mobile telephone), all of the control RFIs subsequent to those for the first resource block (block RB1 for UE1 in FIG. 5) of the TTI to be combined and included within the first localised resource allocation, that is the first resource block. Thus, in the example illustrated in FIG. 5, for the mobile telephone UE1, the first resource block RB1 contains at I4 all of the control RFIs for the TTI subsequent to those for the first resource block. This method has the potential for larger coding gain due to the concatenation of all the RFIs of the discontinuous localised allocations. However, since the number of RFIs in a TTI is dynamic and will depend on the number of discontinuous localised allocations allocated to the user by the resource allocation module 33, an additional field is needed within the information I1' in the shared control channel 51 for the first resource allocation to indicate the number of discontinuous localised allocations and/or the size of the concatenated data and control RFIs. For example, two bits in the main shared control channel may be enough to indicate up to four discontinuous localised allocations. In this case, the "Follow Up" bit of FIG. 4 is not needed.

Third Example

In this example, dynamic switching between the list of RFI fields as in the second example and the bit mapping method is included in the Scheduled Resource Blocks.

Where, as in the case of the second example, resource allocation information for all subsequent resource allocations is in the data channel of one resource allocation, when the number of discontinuous localised allocations increases, the number of signalling information bits also increases and can eventually exceed the number required for the bit map method. However, when this limit is reached we can place a bit map in the first allocated data region instead of the list of RFI fields. This can be indicated by reserving one value of the 'number of RFIs' field in the shared control channel. An example is shown in Table 1 for the case of 20 MHz.

TABLE 1

Concatenation Indicator field included in the shared control channel.

| | |
|---|---|
| 000 | No additional control RFI is present |
| 001 | 1 additional control RFI is present |
| 010 | 2 additional control RFIs are present |
| . | |
| . | |
| . | |
| 110 | 6 additional control RFIs are present |
| 111 | More than 6 additional control RFIs are present, and are indicated using a bit map in the first allocation. |

Signalling Overhead Comparison to Bit Map Method

This section provides an overhead estimate of each of the first to third examples compared to the bit map method.

Table 2 shows the number of bits required on the shared control channel and in the data part for each of the first to third examples (Alt 1 to Alt 3). In Table 2, y is the number of discontinuous allocations to be signalled, x is the number of bits needed to signal one resource allocation using the 'tree-based' method and n is the number of bits needed using the bit map method (see Table 3). In the case of the third example, one of the two options is selected each TTI according to the value of y, in order to minimise the number of bits required.

TABLE 2

Signalling overhead estimation without Discontinuous allocations for all bandwidths

|  | First Example | Second Example | Third Example When RFI is signalled | Third Example When bit map is signalled |
|---|---|---|---|---|
| Shared Control Channel | | | | |
| RB indicator | x | x | x | x |
| 'Follow-up' bit | 1 | | | |
| 'Concatenation Indicator' | | 3 | 3 | 3 |
| Data Channel | | | | |
| RB indicator | x(y − 1) | x(y − 1) | x(y − 1) | n |
| 'Follow-up bit' | (y − 1) | | | |
| CRC | 8(y − 1) | 8 if y > 1<br>0 otherwise | 8 if y > 1<br>0 otherwise | 8 |
| Total | (x + 9)y − 8 | x + 3, if y = 1<br>x · y + 11, y > 1 | x + 3, if y = 1<br>x · y + 11, y > 1 | x + n + 11 |

TABLE 3

Number of bits needed to signal one allocation

| | Bandwidth (MHz) | | | | | |
|---|---|---|---|---|---|---|
| | 1.25 | 2.5 | 5 | 10 | 15 | 20 |
| Bit map Method (n bits) | 6 | 12 | 25 | 50 | 75 | 100 |
| Tree-Method (x bits) | 5 | 7 | 9 | 11 | 12 | 13 |

Figures 6A, 6B:
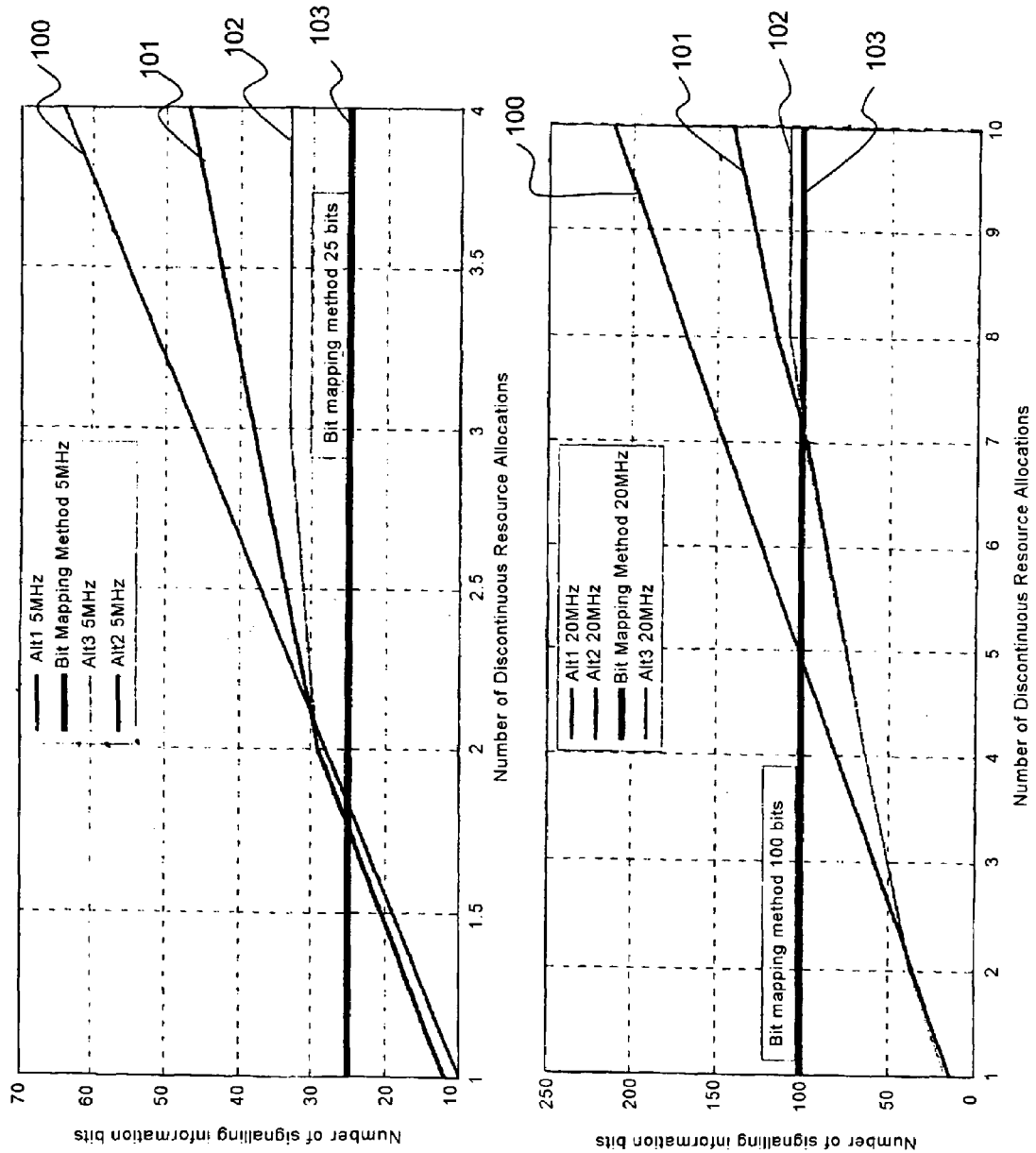
FIG. 6A shows a graph of number of signalling information bits against overhead estimation of the signalling information bits to compare first to third methods in accordance with the invention and a bit map method for a 5 MHz bandwidth, in short, overhead estimation of the signalling information bits for 5 MHz bandwidth.
FIG. 6B shows a graph of number of signalling information bits against overhead estimation of the signalling information bits to compare first to third methods in accordance with the invention and a bit map method for a 20 MHz bandwidth, in short, overhead estimation of the signalling information bits for 20 MHz band width

FIGS. 6A and 6B compare the first to third examples with the bit map method for 5 MHz and 20 MHz respectively, using the equations in Table 2. In FIGS. 6A and 6B, the lines 100, 101, 102 and 103 represent the first example (Alt 1), the second example (Alt 2), the third example (Alt 3) and the bit map method, respectively. It can be seen from the 20 MHz case shown in FIG. 6B that the second example (alt2) uses fewer bits than the bit map method if the number of discontinuous allocations is below eight. However, in the 5 MHz case (FIG. 6A), the second example (alt) uses more bits than the bit map method with only two discontinuous allocations.

In the case of the third example (alt3), the bit map mode becomes more efficient when the number of discontinuous allocations reaches 3, 5, 7 and 8 for 5 MHz, 10 MHz, 15 MHz and 20 MHz, respectively.

It should be noted that user equipment UE will not always be assigned a large number of discontinuous localised allocations. In most of the cases, a small number of discontinuous localised allocations might be assigned. In that case, a lot of signalling bits will be saved compared to when full bit map method is always used.

Fourth Example

Another method in accordance with the invention for signalling downlink resource allocation will now be explained with the aid of FIG. 7 which again shows a diagram representing part of a TTI 50 comprising resource blocks RB and a corresponding set of fixed size shared control channels 51 monitored by the mobile telephones UE1 to UEn. In this example, resource blocks RB1, RB4 and RB7 are shown allocated to mobile telephone UE2, resource blocks RB2 and RB5 are shown allocated to mobile telephone UE3, resource block RB3 is shown allocated to mobile telephone UE1 and resource block RB6 is shown allocated to mobile telephone UE4.

Figure 7:
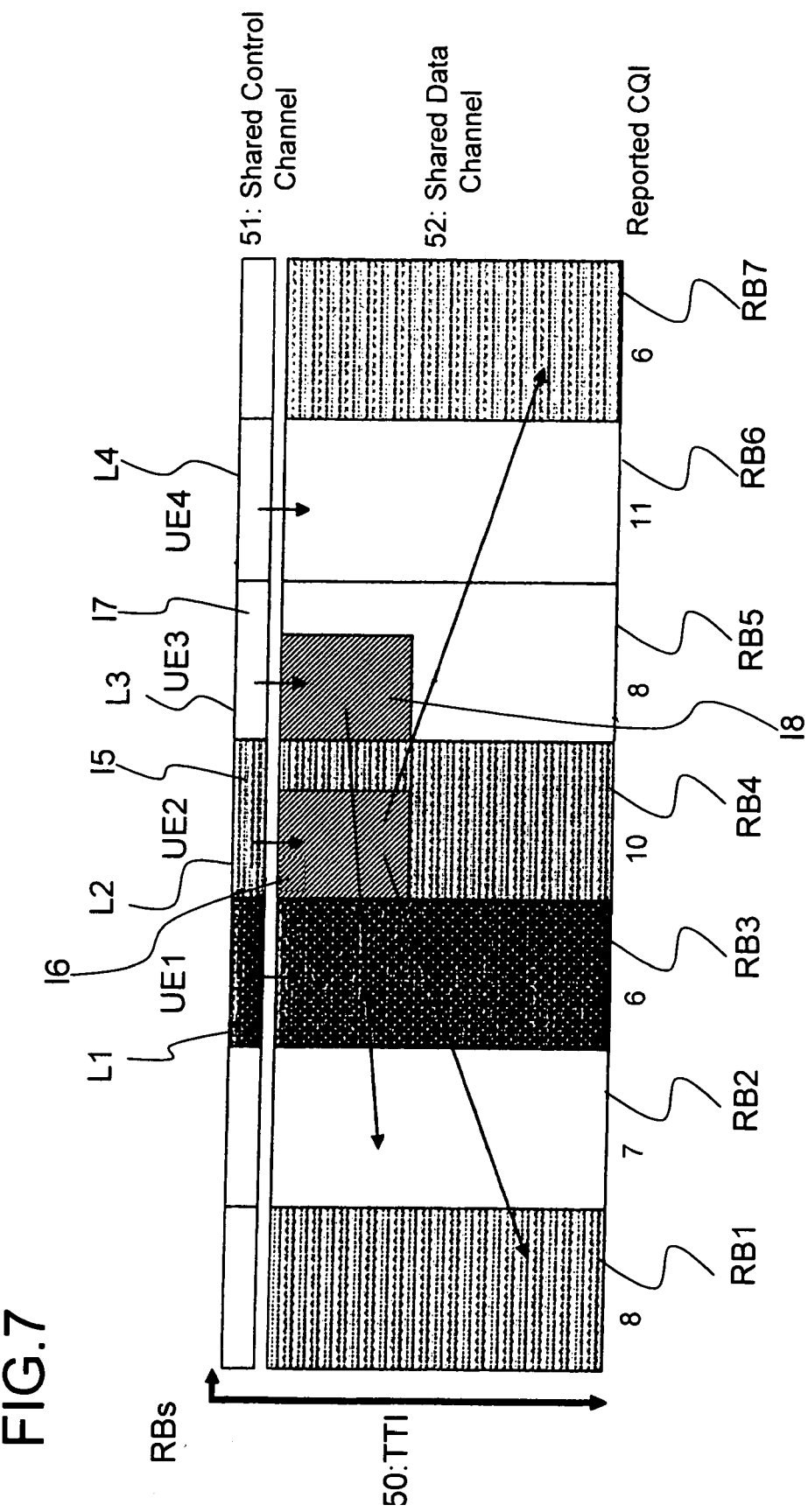

In the example shown in FIG. 7, the resource allocation module 33 is configured to cause the shared control channel L1, L2, L3 or L4 for a mobile telephone not to be allocated to the first resource block for that mobile telephone but rather to be transmitted in the resource block having the best CQI and also to cause the downlink resource allocation information for a mobile telephone to be located in the resource block RB that has the best CQI.

Thus, in the example shown in FIG. 7, the resource allocation module 33 transmits the shared control channel L2 in the resource block RB4 because that resource block has a CQI of 10 whereas the other resource blocks RB1 and RB7 associated with that mobile telephone have CQIs of 8 and 6, respectively. Similarly, the resource allocation module 33 transmits the shared control channel L3 in the resource block RB5 because the resource block RB5 has a CQI of 8 whereas the other resource block RB2 associated with that mobile telephone has a CQI 7. The shared control channels L1 and L4 for the mobile telephones UE1 and UE4 are transmitted in the only allocated resource block RB3 (CQI 6) and RB6 (CQI 11) allocated to those mobile telephones, respectively.

In the example illustrated by FIG. 7, the data TFIs and the control RFI for the resource block having the highest CQI are contained within the corresponding shared control channel L1, L2 L3 or L4 and the control RFIs for any other resource blocks in the TTI allocated to that mobile telephone are contained in the highest CQI resource block. Thus, for the mobile telephone UE2, the control channel L2 contains information I5 comprising the data TFIs and the control RFI for the resource block RB4 and the resource block RB4 contains information I6 comprising the control RFIs for the other resource blocks (RB1 and RB7) allocated to the mobile telephone UE2 in the current TTI. Similarly, for the mobile telephone UE3, the control channel L3 contains information 17 comprising the data TFIs and the control RFI for the resource block RB5 and the resource block RB5 contains information 18 comprising the control RFIs for the other resource block RB2 allocated to the mobile telephone UE3 in the current TTI. The location of the control channel in the resource block having the best CQI and the location of the control RFIs for any other resource blocks allocated to that mobile telephone in the resource block having the best CQI maximises the probability of successful decoding by the decoder module 91 of the mobile telephone.

Fifth Example

Figure 8:
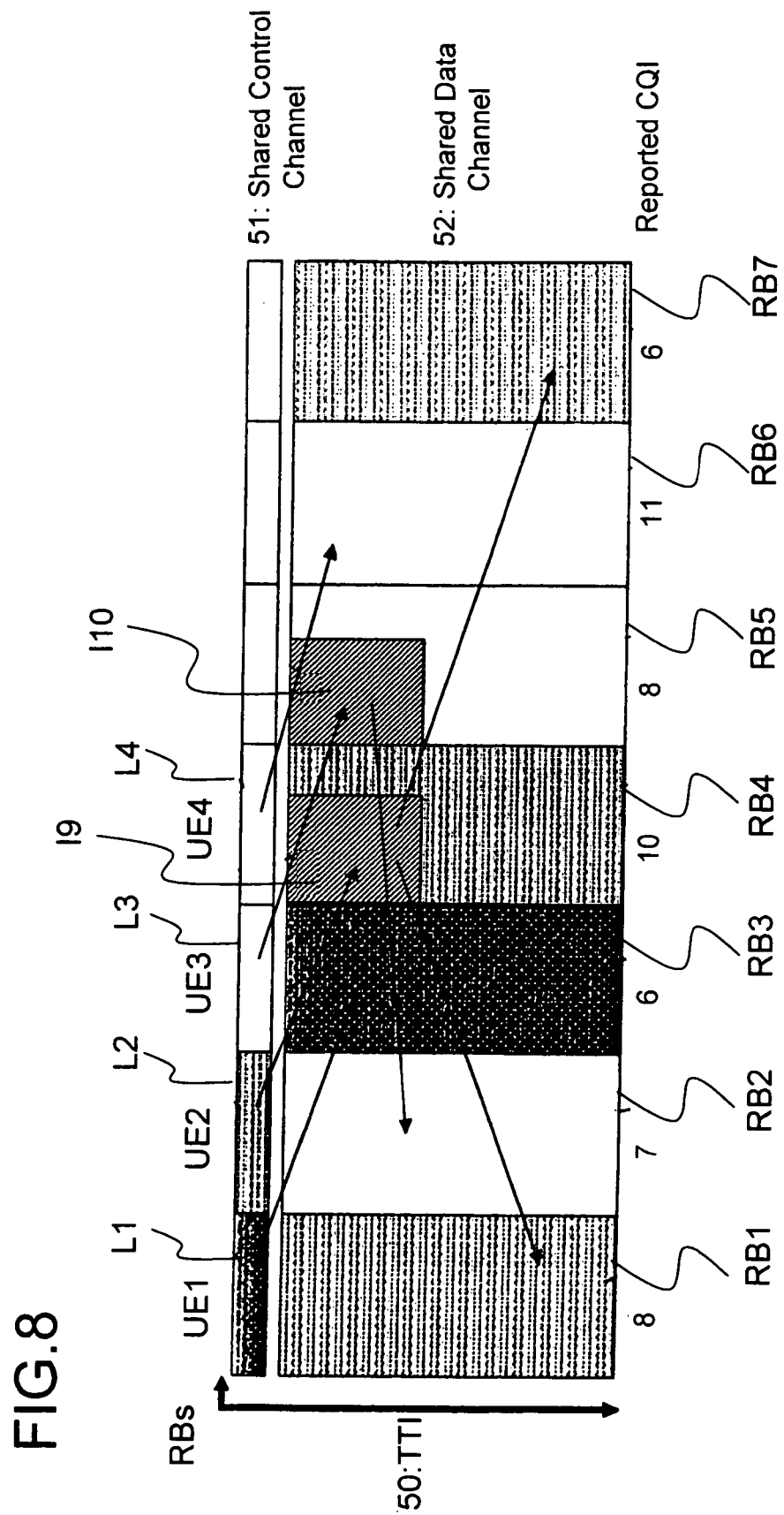

FIG. 8 shows a diagram for explaining another method in accordance with the invention for signalling downlink resource allocation which differs from the method shown in FIG. 7 in that the resource allocation module 33 is in this example configured to fill the shared control channels 51 frequency slots in the order in which the mobile telephone UE processes the control channels to determine the control channel in which it is scheduled. The order in which a mobile telephone UE processes the control channels corresponds to leftmost to rightmost in FIG. 8, so that the control channels L1, L2, L3 and L4 are associated with the first four leftmost resource blocks in the example shown. In this case, the information comprising the control RFIs and data TFIs in the control channel L1, L2, L3 or L4 points the mobile telephone to the resource block allocated to that mobile telephone that has the best CQI, in the example shown this is the resource block RB4 for the mobile telephone UE2 and the resource block RB5 for the mobile telephone UE3. As in FIG. 7, the resource allocation module 33 is configured to cause the best CQI resource block for each mobile telephone to contain the information comprising the control RFIs for the other resource blocks allocated to that mobile telephone, so in the example shown for the mobile telephones UE2 and UE3, resource blocks RB4 and RB5 contain information I9 and I10 comprising the control RFIs. It will of course be appreciated that the order shown in FIG. 8 is only an example and that other processing orders are possible.

The filling of the shared control channels 51 in the order which a mobile telephone UE processes the control channels, that is from the leftmost to the rightmost slot in FIG. 8, minimises decoding delay of the shared control channels compared to the scenario shown in FIG. 7.

Sixth Example

Figure 9:
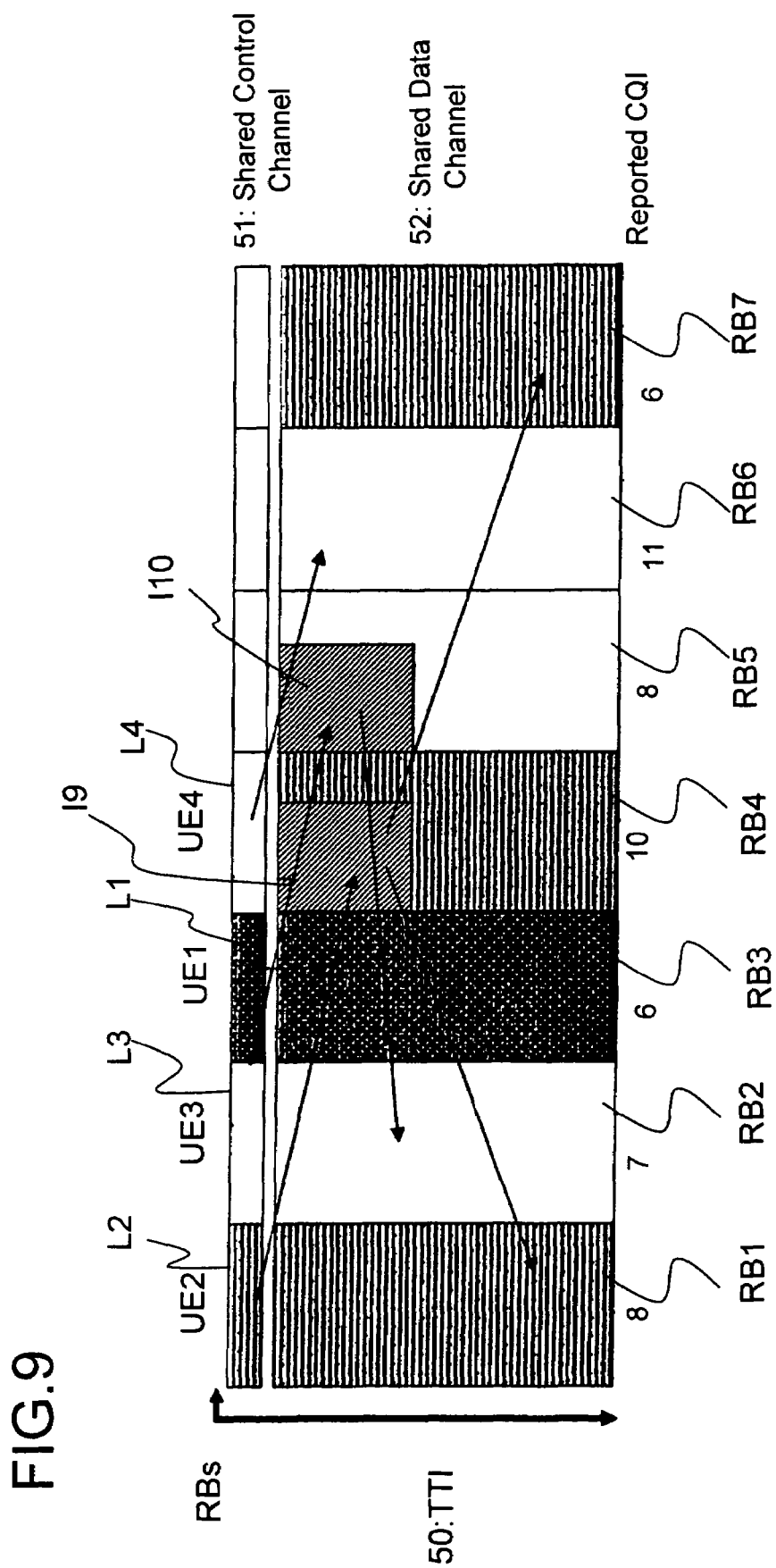

FIG. 9 shows a diagram for explaining another method in accordance with the invention for signalling downlink resource allocation. As in FIG. 8, the resource allocation module 33 causes the shared control channel 51 to be filled from the left, but in this example, the mobile telephones UE are ordered by the resource allocation module 33 of the base station to try to transmit each UE's shared control channel L1, L2, L3 and L4 in the resource block RB with the best possible CQI for that user so that the order in which the shared control channel 51 is filled depends upon the CQI for the user, in the example shown this results in the filling order being L2, L3, L1 and then L4. As in FIG. 8, the information comprising the control RFIs and data TFIs in the control channel L1, L2, L3 or L4 points the corresponding mobile telephone to the resource block allocated to that mobile telephone that has the best CQI, in the example shown this is the resource block RB4 for the mobile telephone UE2 and the resource block RB5 for the mobile telephone UE3. As in FIG. 8, the resource allocation module 33 is configured to cause the best CQI resource block for each mobile telephone to contain the information comprising the control RFIs for the other resource blocks allocated to that mobile telephone, so in the example shown for the mobile telephones UE2 and UE3, resource blocks RB4 and RB5 again contain information I9 and I10 comprising the control RFIs.

The method illustrated by FIG. 9, minimizes decoding delay of shared control channel whilst trying to maximize the probability of correct decoding.

Seventh Example

Figure 10:
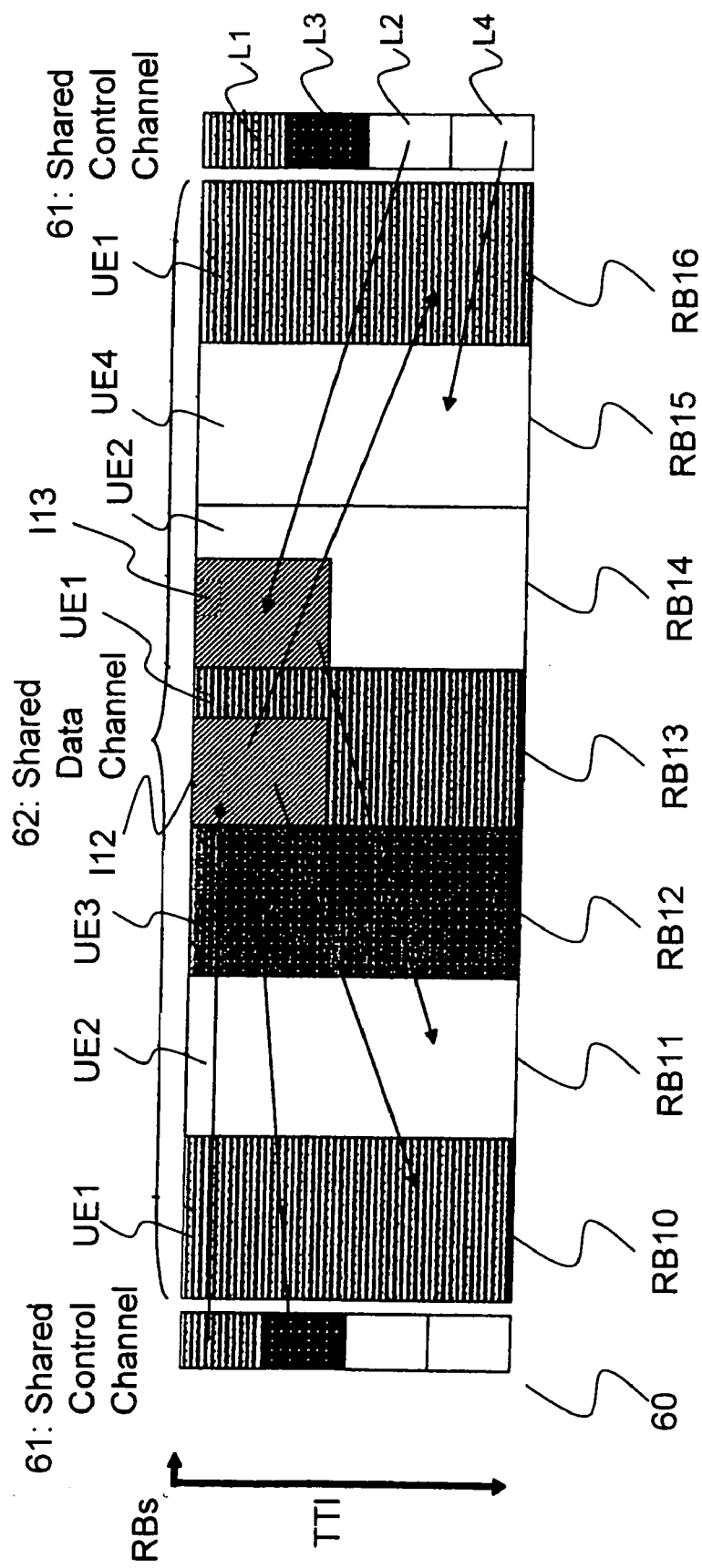

The above described methods may be applied where frequency rather than time division multiplexing is used to separate the Shared Control Channel and Shared Data Channel. FIG. 10 shows a diagram for explaining a method, similar to FIG. 9, of signalling downlink resource allocation where the shared control channel 61 and shared data channel 62 of a TTI are separated by frequency rather than time division multiplexing, as in the earlier examples. FIG. 10 again shows downlink resource allocation for four mobile telephones UE1 to UE4. The resource allocation module 33 has in this example allocated resource blocks RB10, RB13 and RB16 of the shared data channel to mobile telephone UE1, resource blocks RB11 and RB14 to mobile telephone UE2, resource block RB12 to mobile telephone UE3, and resource block RB15 to mobile telephone UE4. In this example, the resource allocation module 33 again causes the corresponding control channel L1 to L4 to contain the information comprising the data TFIs and the control RFI for the best CQI resource block (resource blocks RB 13 and RB 14 for mobile telephones UE1 and UE2, respectively, in FIG. 10) for the corresponding mobile telephone and the best CQI resource block contains information (112 and 113 in resource blocks RB 13 and RB 14, respectively) comprising the control RFIs for the other resource blocks allocated to that mobile telephone.

CONCLUSIONS

In embodiments described above, resource allocation information is signalled to user devices in a communications system in which each user device is allocated plural resource allocations by, for each user device, providing information regarding a selected resource allocation allocated to that user device in a control channel and providing information regarding at least one other resource allocation allocated to that user device in a data channel in the selected resource allocation. In one example, the selected resource allocation is the first resource allocation allocated to that user device and information regarding each successive further resource allocation is provided in a data channel in the resource allocation preceding that successive further resource allocation. In another example, the selected resource allocation is the first resource allocation allocated to that user device and information regarding each successive further resource allocation is provided in a data channel in the first resource allocation. In another example, the selected resource allocation is the resource allocation that is indicated to have the best channel quality.

It is shown that alternative 3 achieves significant reduction in control signalling overhead compared to when full bitmap signalling is always used.

Methods have been described above for indicating discontinuous localised resource allocations applicable to the EUTRA downlink. Example 3 (Alt 3) in particular achieves significant reduction in control signalling overhead compared to when full bitmap signalling is always used. Hence, we propose to adopt such method for LTE (Long Term Evolution) DL (Down Link) resource assignment.

MODIFICATIONS AND ALTERNATIVES

A number of detailed examples have been described above. As those skilled in the art will appreciate, a number of modifications and alternatives can be made to the above examples whilst still benefiting from the inventions embodied therein. By way of illustration only a number of these alternatives and modifications will now be described.

It will of course be appreciated that the particular resource allocations shown in FIGS. 4 to 10 are simply examples and that other resource allocations are possible.

Where appropriate and compatible, features described with respect to any of the above examples described above may be used in the other examples.

In the above-described examples, there is a plurality of control channels each containing scheduling information for a corresponding user device. However, the present invention may be applied where there is a single joint coded control channel or where there is a plurality of joint coded control channels and the mobile telephones are organized in groups with each group being associated with a corresponding one of plurality of joint coded control channels.

In the above examples, the user equipments are mobile telephones. The user equipments could however be any user equipment capable of communicating via a mobile telecommunications system.

In the above examples, a mobile telephone based telecommunication system was described in which the above described signalling techniques were employed.

As those skilled in the art will appreciate, the invention is not limited to this particular size of bandwidth or to the size of the sub-bands mentioned above. In the above examples, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones UE in order to update their functionalities.

Particularly, the present invention includes the following modes.
(1) A method of signalling communications resource allocation information substantially as described herein with reference to or as shown in the accompanying drawings.
(2) A method of receiving communications resource allocation information substantially as described herein with reference to or as shown in the accompanying drawings.
(3) A base station for signalling communications resource allocation information substantially as described herein with reference to or as shown in the accompanying drawings.
(4) A user device for receiving communications resource allocation information substantially as described herein with reference to or as shown in the accompanying drawings.

The invention claimed is:

1. A method, performed by a base station, of communicating communications control information with a user device in an Evolved Universal Terrestrial Radio Access (E-UTRA) mobile telecommunications system in which plural user devices are each allocated plural orthogonal frequency-division multiplexing (OFDM) resource allocations including at least one resource allocation within which a data channel is to be located, the method comprising:
   communicating, at a time for which said user device has not received the at least one resource allocation, at least a part of respective control information for said user device over an E-UTRA air interface using a control channel; and
   communicating, at a time for which said user device has received the at least one resource allocation, at least a further part of the control information for said user device using the data channel in the at least one of the resource allocations for said user device,
   wherein said at least part of the respective control information communicated using the control channel is a same type as said at least a further part of the respective control information communicated using the data channel.

2. A method according to claim 1, which further comprises selecting a resource allocation allocated to the user device that has a best channel quality indicator as the at least one resource allocation within which the data channel is located.

3. A method according to claim 1, which further comprises providing control information, in the data channel in the at least one resource allocation, comprising resource allocation information regarding one other resource allocations allocated to the user device.

4. A method according to claim 1, which further comprises providing control information comprising resource allocation information regarding a successive resource allocation in a data channel in a preceding resource allocation.

5. A method according to claim 1, which further comprises selecting a first resource allocation allocated to the user device as the at least one resource allocation within which the data channel is located, and providing control information comprising resource allocation information regarding a next resource allocation in the data channel in the first resource allocation.

6. A method according to claim 1, which further comprises, for each user device, selecting a first resource allocation allocated to that user device as the at least one resource allocation within which the data channel is located, and providing control information comprising resource allocation information regarding each successive further resource allocation in a data channel in a resource allocation preceding that successive further resource allocation.

7. A method according to claim 1, which further comprises, for each user device, selecting a first resource allocation allocated to that user device as the at least one resource allocation within which the data channel is located, and providing control information comprising resource allocation information regarding each successive further resource allocation in the data channel in the first resource allocation.

8. A method according to claim 7, wherein the part of said control information provided in the control channel comprises resource allocation information regarding the at least one resource allocation within which the data channel is to be located, and
   wherein the method further comprises providing, with the resource allocation information in the control channel, data indicating at least one of a size of the resource allocation information regarding each successive further resource allocation, and a number of resource allocations allocated to that user device.

9. A method according to claim 4, which further comprises providing with the resource allocation information data indicating whether or not there are additional resource allocations.

10. A method according to claim 1, which further comprises, for each user device, selecting the resource allocation allocated to that user device that is indicated to have a best channel quality as the at least one resource allocation within which the data channel is located, and providing control information comprising resource allocation information regarding the other resource allocations allocated to the user device in the data channel of the at least one resource allocation.

11. A method according to claim 3, wherein the resource allocation information is provided in the data channel as a list of RFI fields or as a bit map, dependent upon a number of other resource allocations for which the resource allocation information is provided.

12. A method according to claim 11, wherein the control channel comprises an indicator that identifies the number of other resource allocations for which the resource allocation information is provided and whether the resource allocation information is provided as the list of RFI fields or as the bit map.

13. A method according to claim 1, which further comprises transmitting the control channel in a resource allocation having a best channel quality indicator.

14. A method according to claim 1, wherein there is a plurality of control channels each containing scheduling information for a corresponding user device, or there is a single joint coded control channel or a plurality of joint coded control channels.

15. A method according to claim 1, wherein there is a plurality of control channels each containing scheduling information for a corresponding user device and the method comprises transmitting each control channel in a first resource allocation allocated to the corresponding user device.

16. A method according to claim 1, wherein there is a plurality of control channels each containing scheduling information for a corresponding user device, and wherein the method further comprises transmitting each control channel in the resource allocation allocated to the corresponding user device that has a best channel quality indicator.

17. A base station for use in an Evolved Universal Terrestrial Radio Access (E-UTRA) mobile telecommunications system, in which each of a plurality of user devices are allocated plural orthogonal frequency-division multiplexing (OFDM) resource allocations including at least one resource allocation within which a data channel is to be located, the base station being operable to communicate communications control information with a user device by:
    communicating, at a time for which said user device has not received the at least one resource allocation, at least a part of the control information for said user device over an E-UTRA air interface using a control channel; and
    communicating, at a time for which said user device has received the at least one resource allocation, at least a further part of the control information for said user device using the data channel in the at least one of the resource allocations for the user device,
    wherein said at least part of the respective control information communicated using the control channel is a same type as said at least a further part of the respective control information communicated using the data channel.

18. A method, performed by a user device, of communicating communications control information with a base station in an Evolved Universal Terrestrial Radio Access (E-UTRA) mobile telecommunications system, in which plural user devices are each allocated plural orthogonal frequency-division multiplexing (OFDM) resource allocations including at least one resource allocation within which a data channel is to be located, the method comprising:
    communicating, at a time for which said user device has not received the at least one resource allocation, at least a part of the control information for said user device over an E-UTRA air interface using a control channel; and
    communicating, at a time for which said user device has received the at least one resource allocation, at least a further part of the control information for said user device using the data channel in the at least one of the resource allocations for the user device,
    wherein said at least part of the respective control information communicated using the control channel is a same type as said at least a further part of the respective control information communicated using the data channel.

19. A user device for use in an Evolved Universal Terrestrial Radio Access (E-UTRA) mobile telecommunications system, in which each of a plurality of user devices are allocated plural orthogonal frequency-division multiplexing (OFDM) resource allocations including at least one resource allocation within which a data channel is to be located, the user device being operable to communicate communications control information with a base station by:
    communicating, at a time for which said user device has not received the at least one resource allocation, at least a part of the control information for said user device over an E-UTRA air interface using a control channel; and
    communicating, at a time for which said user device has received the at least one resource allocation, at least a further part of the control information for said user device using the data channel in the at least one of the resource allocations for the user device,
    wherein said at least part of the respective control information communicated using the control channel is a same type as said at least a further part of the respective control information communicated using the data channel.

20. A method of communicating communications control information for a user device in an Evolved Universal Terrestrial Radio Access (E-UTRA) mobile telecommunications system, in which plural user devices are each allocated plural orthogonal frequency-division multiplexing (OFDM) resource allocations, the method comprising:
    selecting a first resource allocation allocated to said user device as at least one resource allocation within which a data channel is to be located;
    communicating at least a part of respective control information for the user device over an E-UTRA air interface using a control channel; and
    communicating at least a further part of the control information, comprising resource allocation information regarding a next resource allocation for said user device, using the data channel in the first resource allocation for said user device.

21. A method of communicating communications control information for a user device in an Evolved Universal Terrestrial Radio Access (E-UTRA) mobile telecommunications system, in which plural user devices are each allocated plural orthogonal frequency-division multiplexing (OFDM) resource allocations, the method comprising:
    selecting a first resource allocation allocated to said user device as at least one resource allocation within which a data channel for said user device is to be located;

communicating at least a part of respective control information for said user device over an E-UTRA air interface using a control channel;

communicating at least a further part of the control information, comprising resource allocation information regarding a next resource allocation for said user device, using the data channel in the first resource allocation for said user device; and communicating at least a further part of the control information, comprising resource allocation information regarding each successive further resource allocation for said user device, using a data channel in a resource allocation preceding that successive further resource allocation.

22. A method of communicating communications control information for a user device in an Evolved Universal Terrestrial Radio Access (E-UTRA) mobile telecommunications system, in which plural user devices are each allocated plural orthogonal frequency-division multiplexing (OFDM) resource allocations, the method comprising:

selecting a first resource allocation allocated to said user device as at least one resource allocation within which a data channel for said user device is to be located;

communicating at least a part of respective control information for said user device over an E-UTRA air interface using a control channel;

communicating at least a further part of the control information, comprising resource allocation information regarding a next resource allocation for said user device, using the data channel in the first resource allocation for said user device; and communicating at least a further part of the control information, comprising resource allocation information regarding each successive further resource allocation for said user device, using the data channel in the first resource allocation for said user device.

23. A method of communicating communications control information for a user device in an Evolved Universal Terrestrial Radio Access (E-UTRA) mobile telecommunications system, in which plural user devices are each allocated plural orthogonal frequency-division multiplexing (OFDM) resource allocations, the method comprising:

selecting a resource allocation, allocated to said user device, that is indicated to have a best channel quality as at least one resource allocation within which a data channel for said user device is to be located;

communicating at least a part of respective control information for said user device over an E-UTRA air interface using a control channel; and communicating at least a further part of the control information, comprising resource allocation information regarding other resource allocations allocated to said user device, using the data channel in the at least one resource allocation.

24. A method of communicating communications control information for a user device in an Evolved Universal Terrestrial Radio Access (E-UTRA) mobile telecommunications system, in which plural user devices are each allocated plural orthogonal frequency-division multiplexing (OFDM) resource allocations, the method comprising:

communicating at least a part of respective control information for said user device over an E-UTRA air interface using a control channel; and communicating at least a further part of the control information comprising resource allocation information regarding the other resource allocations allocated to said user device using a data channel in at least one of the resource allocations for said user device, wherein the resource allocation information is provided in the data channel as a list of RFI fields or as a bit map, dependent upon a number of the other resource allocations for which the resource allocation information is provided.

25. A method according to claim 24, wherein the control channel comprises an indicator that identifies the number of the other resource allocations for which the resource allocation information is provided and whether the resource allocation information is provided as the list of RFI fields or as the bit map.

* * * * *